(12) United States Patent
Sahara et al.

(10) Patent No.: US 6,367,117 B1
(45) Date of Patent: Apr. 9, 2002

(54) WIPER BLADE

(75) Inventors: Hideshi Sahara, Toyohashi; Hidenori Ishihara, Hamamatsu, both of (JP)

(73) Assignee: Asmo Co., Ltd., Shizuoka-Pref. (JP)

( * ) Notice: Subject to any disclaimer, the term of this patent is extended or adjusted under 35 U.S.C. 154(b) by 0 days.

(21) Appl. No.: 09/207,364

(22) Filed: Dec. 8, 1998

(30) Foreign Application Priority Data

Mar. 20, 1998 (JP) .......................................... 10-072493

(51) Int. Cl.[7] .................................................. B60S 1/38
(52) U.S. Cl. .............................. 15/250.201; 15/250.44; 15/250.46
(58) Field of Search ....................... 15/250.44, 250.201, 15/250.46, 250.451, 250.361, 250.43, 250.48, 250.452, 250.453, 250.454

(56) References Cited

U.S. PATENT DOCUMENTS 4,766,636 A * 8/1988 Shinpo .................. 15/250.201
4,788,736 A * 12/1988 Arai et al. ............... 15/250.46
5,179,761 A * 1/1993 Buechele et al. ......... 15/250.44
5,454,135 A * 10/1995 Okuya et al. .......... 15/250.201
5,946,764 A * 9/1999 Tworzydlo ............. 15/250.201

FOREIGN PATENT DOCUMENTS

| EP | 343869 | * 11/1989 | ............... 15/250.44 |
| JP | A-4-129862 | 4/1992 | |
| JP | 5-193452 | * 8/1993 | ............... 15/250.44 |

* cited by examiner

Primary Examiner—Gary K. Graham
(74) Attorney, Agent, or Firm—Fish & Richardson P.C.

(57) ABSTRACT

A wiper blade of a wiper device for wiping a windshield of a vehicle includes a primary lever to be connected to a wiper arm, a pair of secondary levers connected to the primary lever, a pair of yoke levers connected to the pair of secondary lever, and a rubber blade supported by the pair of yoke levers. The first lever has a holder member disposed above the central portion of the rubber blade and a first spoiler extending in longitudinally opposite directions from the holder member along a side of the rubber blade. Each of the secondary lever is disposed above the rubber blade and is connected to one of outer end of the first spoiler, and has a second spoiler extending in a longitudinal direction from the outer edge of the first spoiler on the same side of the rubber blade as the first spoiler. Each of the yoke lever is connected to the outer end of one of the second spoilers.

28 Claims, 5 Drawing Sheets

WIPER BLADE

CROSS REFERENCE TO RELATED APPLICATION

The present application is based on and claims priority from Japanese Patent Application No. Hei 10-72493 filed on Mar. 10, 1998, the contents of which are incorporated herein by reference.

BACKGROUND OF THE INVENTION

1. Field of the Invention

The present invention relates to a wiper blade of a wiper device for wiping a vehicle windshield.

2. Description of the Related Art

A wiper blade of a vehicle wiper device is usually a tournament-graph-type that is effective to wipe a curved windshield. Such a tournament-graph-type wiper blade is composed of a primary lever, a plurality of secondary levers, a plurality of yoke levers and a rubber blade. The primary lever supports the plurality of secondary levers, which supports the plurality of yoke levers. The plurality of yoke levers finally support the rubber blade. In other words, the levers are swingably stacked one on another in the direction perpendicular to the windshield or in the height of the windshield.

Such a tournament-graph-type wiper blade has to increase the number of levers if it has to wipe a curved windshield having a higher curvature. This increases the number of related parts and manufacturing steps, thereby resulting in high cost.

As the number of the levers increase, dynamic lift also increase due to increase of projected area thereof to the cross-section of air flow flowing along the windshield while a vehicle is running. Therefore, a wiper device has to have a strong spring and arm members to prevent the wiper blade from lifting, thereby resulting in high cost.

JP-A-4-129862 proposes a modified tournament-graph-type wiper blade in which respective levers are disposed on the opposite sides of the rubber blade to support the same. Although this structure is effective to reduce the projected area stated above, manufacturing cost necessarily increases if this structure is applied to a windshield having a high curvature because of the tournament-graph-type structure.

SUMMARY OF THE INVENTION

A main object of the present invention is to provide a simple wiper blade having a nice-looking spoiler which can wipe a curved windshield of a high curvature.

According to a main aspect of the invention, a wiper blade including a first lever having a first spoiler extending in longitudinally opposite directions along a side of a rubber blade, a pair of second levers connected to the first spoiler and having a second spoiler extending in line with the first spoiler, a pair of third levers connected to the pair of second spoilers.

Another object of the invention is to provide a wiper blade that can operate even in very cold and freezing conditions.

For this object, the above wiper blade may have a plurality of sealed connecting portions disposed between the first spoiler and each of the pair of second levers and between each of the pair of second spoilers and one of said third levers.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A wiper blade according to a preferred embodiment of the present invention is described with reference to FIGS. 1–6.

Figure 1:
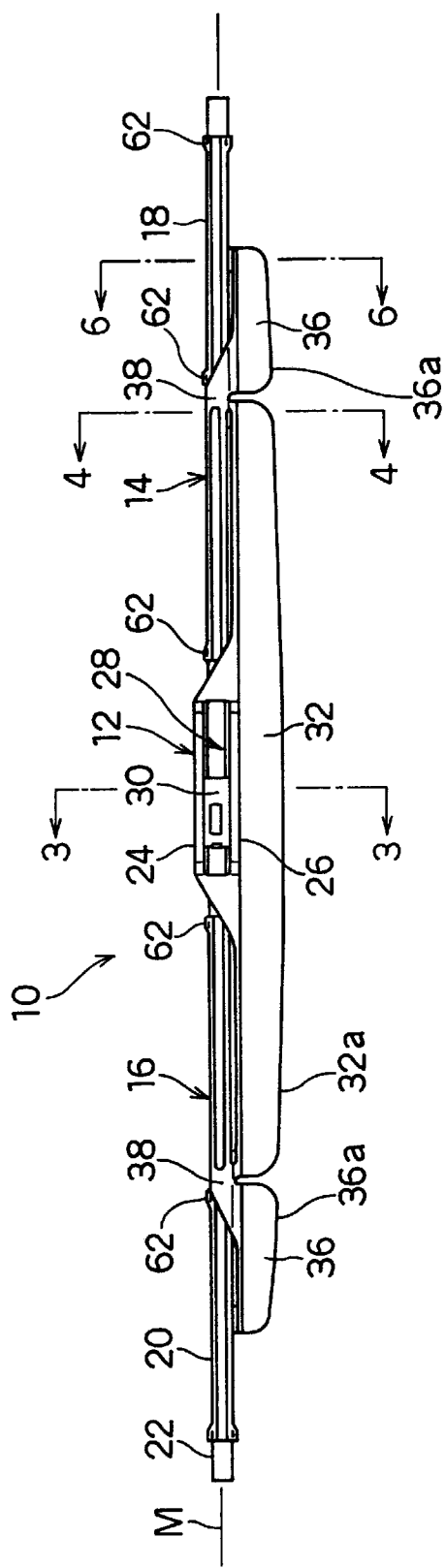
FIG. 1 is a plan view illustrating a wiper blade according to a preferred embodiment of the present invention.
Figure 2:
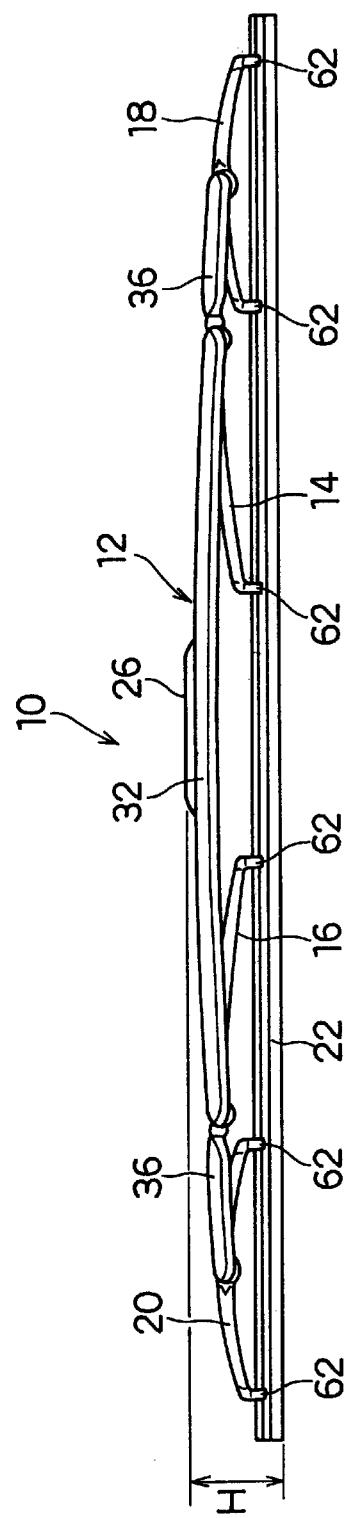
FIG. 2 is a front view of the wiper blade according to the preferred embodiment.
Figure 3:
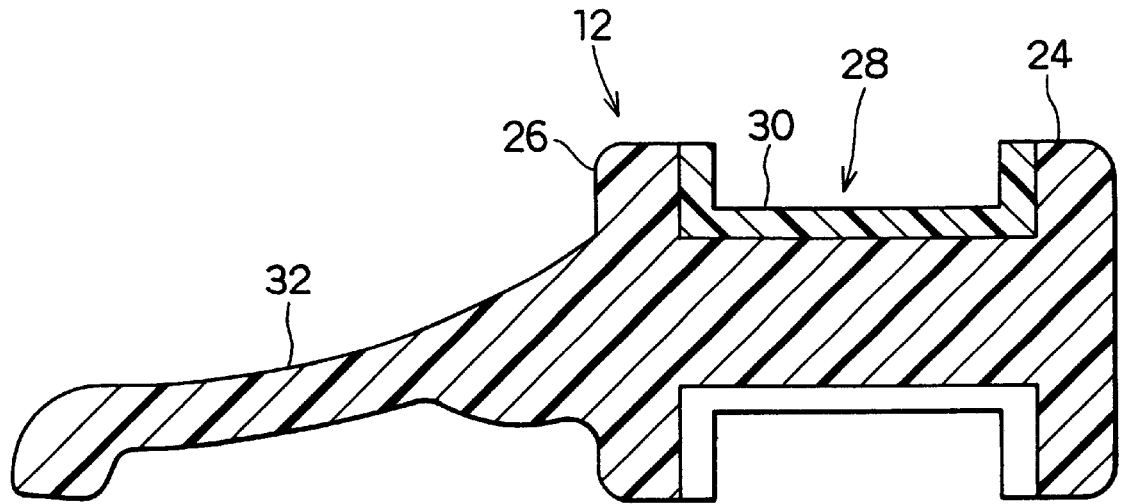
FIG. 3 is an enlarged cross-sectional view illustrating a portion of the wiper blade illustrated in FIG. 1 cut along line 3—3.

As shown in FIGS. 1 and 2, wiper blade 10 is composed of primary lever 12, a pair of secondary levers 14, 16, a pair of yoke levers 18, 20 and a rubber blade 22.

Primary lever 12 is made of resinous material and has rear side member 24, front side member 26. Arm joint 28 is disposed between rear and front side members 24, 26. Holder 30 is made of resilient resinous material and is rotatably connected to primary lever 12 to hold a portion (not shown) of a wiper arm so that primary lever 12 can be driven by the wiper arm in a known manner. Holder 30 is positioned right above longitudinal axis M of rubber blade 22. Primary lever 12 also has first spoiler or air dam 32 integral with front side member 26. First spoiler 32 extends from the portion of front side member 26 both in the upstream direction of air flow (or wiper-closing direction) and in longitudinally opposite directions of rubber blade 22.

Secondary levers 14, 16 are disposed right above longitudinal axis M along the rear side of first spoiler 32. In other words, each of secondary levers 14, 16 extends on the side of first spoiler 32 that is disposed at downstream side of air flow or is wiper-opening side thereof. Secondary levers 14, 16 have respectively second spoiler 36 and bridge portion 38. Each of second spoilers 36 extend both in the upstream direction and in a longitudinal opposite direction to align with first spoiler 32 along the front side of rubber blade 22. Thus, first and second spoilers 32, 36 dot not interfere with the bending motion of rubber blade 22. First spoiler 32 has outer edges 32a, and second spoiler has inner edge 36a. Both edges 32a, 36a are formed to combine both spoilers 32, 36 into a unit, thereby providing a nice-looking and effective unitary spoiler. Secondary levers 14, 16 are made of resinous material and connected respectively to the opposite ends of first spoiler 32. Each of secondary levers 14, 16 has U-shaped grip 62 formed at the inner end thereof to support rubber blade 22.

Figure 4:
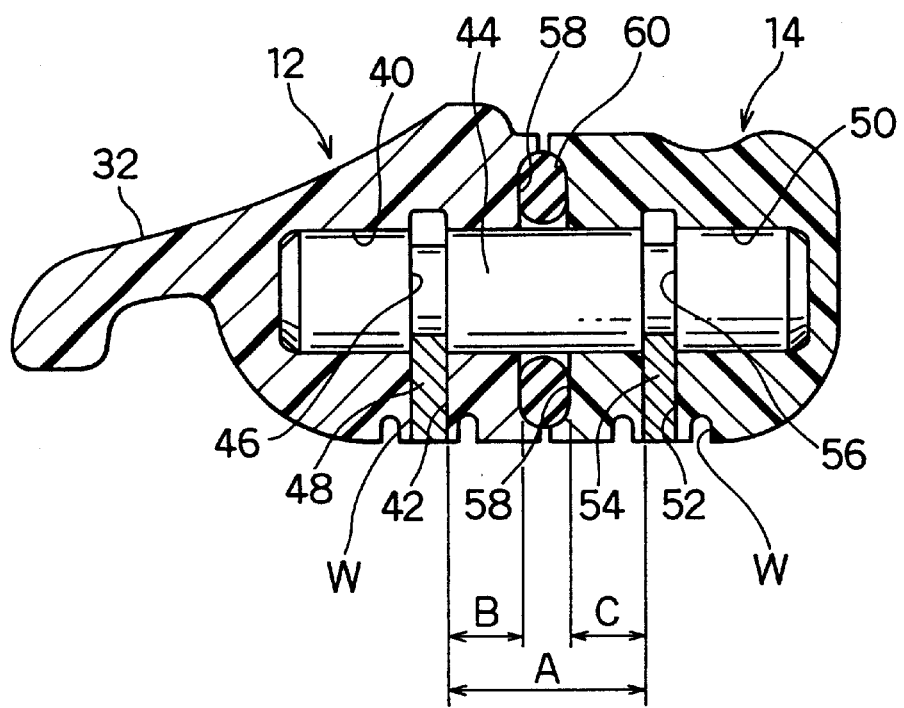
FIG. 4 is an enlarged cross-sectional view illustrating a portion of the wiper blade illustrated in FIG. 1 cut along line 4—4.
Figure 5:
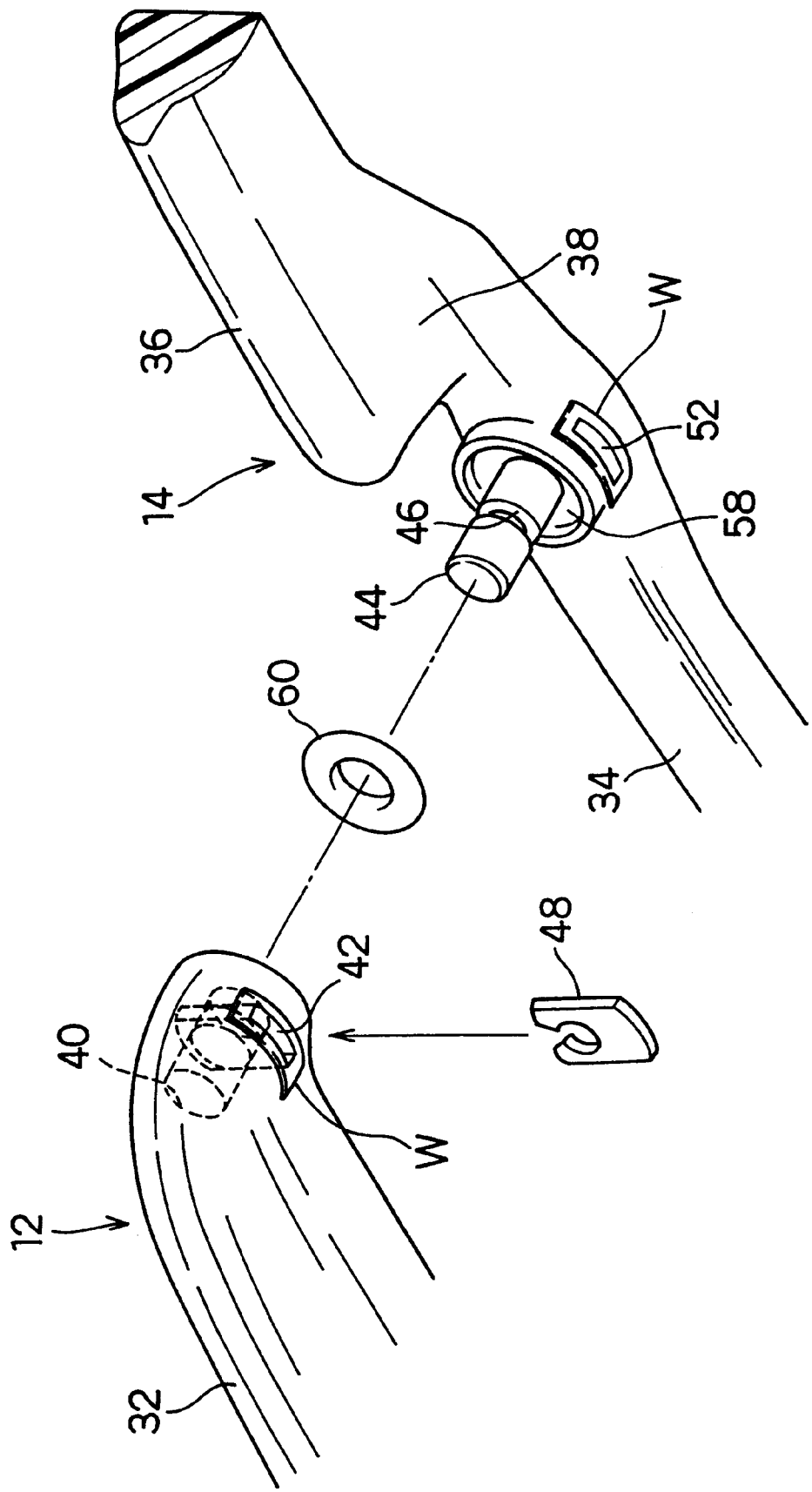
FIG. 5 is a fragmentary enlarged exploded view illustrating a primary lever and a secondary lever of the wiper blade according to the preferred embodiment.

As shown in FIGS. 4 and 5, secondary lever 14 is connected to first spoiler 32 in the following manner.

Hole 40, slit 42, rectangular groove W and concave surface 58 are formed in first spoiler 32, and hole 50, slit 52, rectangular groove W and concave surface 58 are formed in secondary lever 14. Pin 44 has a pair of annular grooves 46 and 56 and is inserted into holes 40, 50. Each of stopper 48, 54 is a C-shaped ring member having a cut portion on the periphery thereof. Stopper 48, 54 are respectively inserted into slits 42, 52 and annular grooves 46, 56 and secured to the inside of grooves 46, 56 by heating and deforming the portions around stoppers surrounded by groove W. Thus, pin 44 is held securely in holes 40, 50 to connect first spoiler 32 or primary lever 12 and secondary lever rotatably, so that slits 42, 52 can be hermetically sealed. Stoppers 48, 54 can be substituted by wire clips or the like. O-ring 60 is inserted between concave surfaces 58 of both first spoiler 32 and secondary lever 14 to hermetically seal the portion surrounding pin 44. For this purpose, the distance A between slit 42 and slit 52 is made shorter than the sum of distance B between slit 42 and concave surface 58, distance C between slit 52 and the other concave surface 58 and the width of O-ring 60 without compression. Thus, secondary lever 14 is ensured to smoothly rotate about pin 44 whenever outside temperature is very low and freezing.

Figure 6:
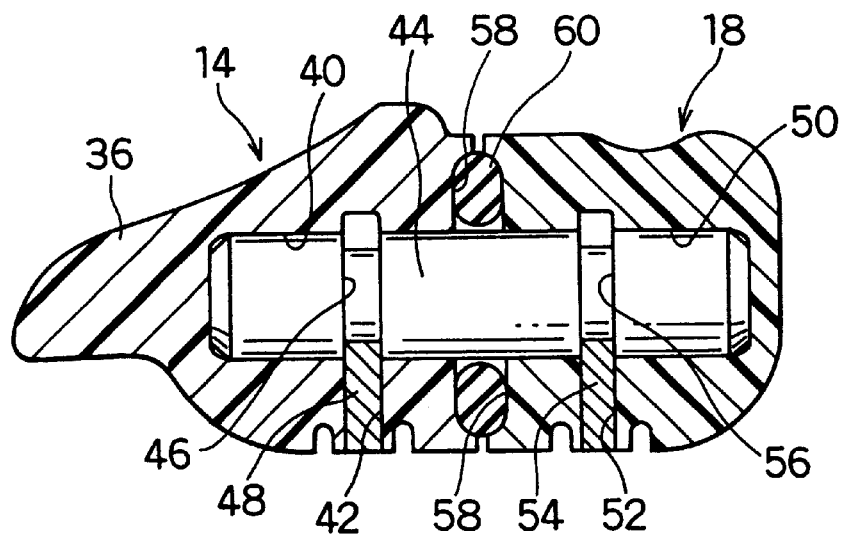
FIG. 6 is an enlarged cross-sectional view illustrating a portion of the wiper blade illustrated in FIG. 1 cut along line 6—6.

Yoke levers 18, 20 are made of resinous material and are disposed above longitudinal axis M along the rear side (wiper-opening side or downstream side) of second spoilers 36. Yoke levers 18, 20 are respectively connected to the outer longitudinal end of second spoilers 36 as shown in FIG. 2 and FIG. 6. Each of yoke levers 18, 20 is connected one of second spoilers 36 in the same manner as described with reference to FIGS. 4 and 5. U-shaped grips 62 are formed at opposite ends of yoke levers 18, 20 to support rubber blade 22 straight together with U-shaped grips of secondary levers 14, 16.

Thus, any of primary, secondary and yoke levers does not overlap in the direction vertical to rubber blade 22. Therefore, the height of the wiper blade can be made small enough to prevent the dynamic lift even a vehicle runs at a high speed. In addition, this structure prevents the wiper blade from catching snow or other foreign material, so that smooth wiping operation can be ensured.

(Variants)

Figure 7:
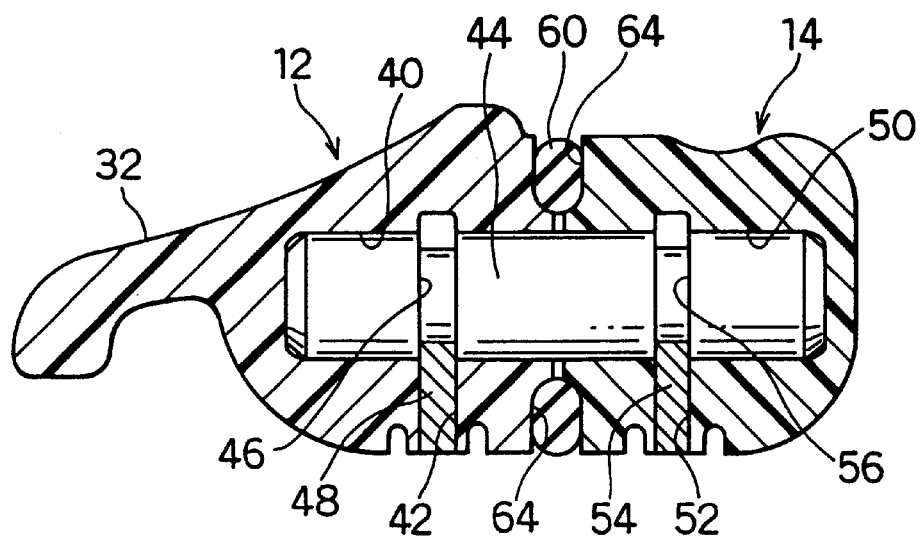
FIG. 7 is an enlarged cross-sectional view illustrating a modified portion of the wiper blade according to the preferred embodiment.

A modified connecting portion of first spoiler 32 and secondary lever 14 is described with reference to FIG. 7.

O-ring 60 is inserted in annular groove 64 instead of the space between two concave surfaces 58 described before. Other portions are the same as the structure described before.

Figure 8:
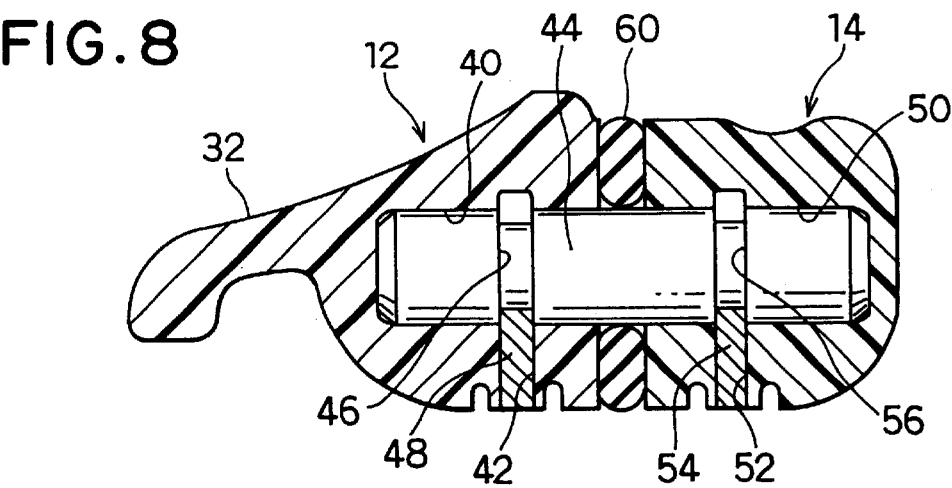
FIG. 8 is an enlarged cross-sectional view illustrating another modified portion of the wiper blade according to the preferred embodiment.

Another modified connecting portion of first spoiler 32 and secondary lever 14 is described with reference to FIG. 8.

O-ring 60 is inserted between flat surfaces instead of the space between two concave surfaces 58 described before. Other portions are the same as the structure described before.

Figure 9:
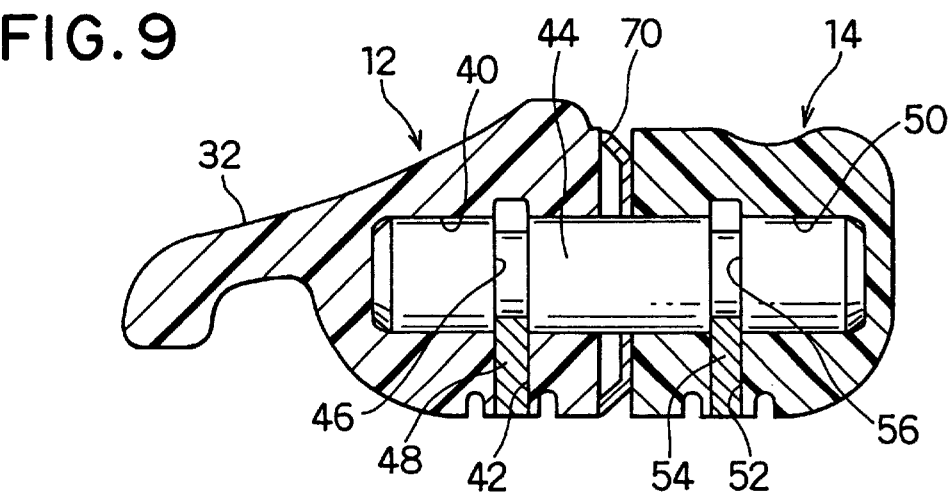
FIG. 9 is an enlarged cross-sectional view illustrating another modified portion of the wiper blade according to the preferred embodiment.

Another modified connecting portion of first spoiler 32 and secondary lever 14 is described with reference to FIG. 9.

Conical disk spring 70 is inserted between flat surfaces instead of O-ring 60 of the above modification. Other portions are the same as the structure described before.

Figure 10:
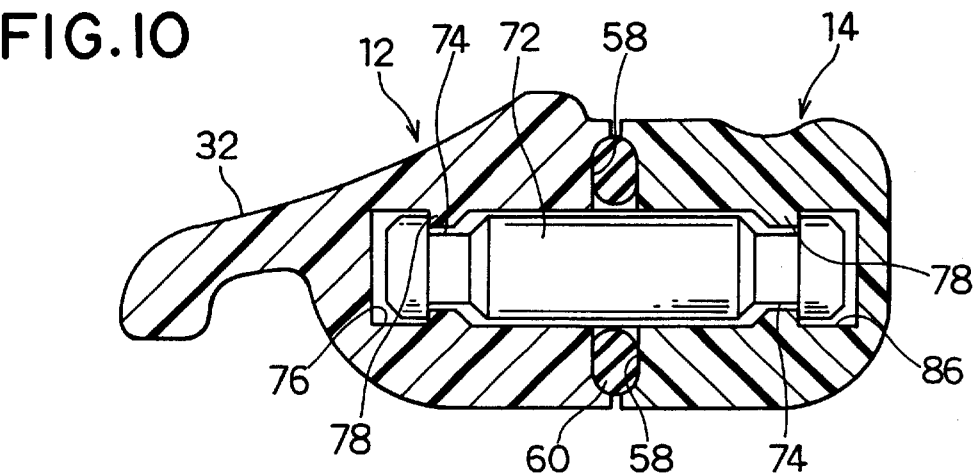
FIG. 10 is an enlarged cross-sectional view illustrating another modified portion of the wiper blade according to the preferred embodiment.

Another modified connecting portion of first spoiler 32 and secondary lever 14 is described with reference to FIG. 10.

Pin 72 is substituted for pin 44 and is press-fitted to holes 76, 86 instead of holes 40, 50. Pin 72 has head-and-neck portions at opposite ends thereof, and holes 76, 86 have wide and narrow portions corresponding to the head-and-neck portions at the opposite ends thereof. Thus, stoppers 48, 54 can be omitted. Other portions are the same as the structure described before.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A wiper blade connectable with a wiper arm of a wiper device for wiping a windshield of a vehicle, said wiper blade including a first lever, a pair of second levers, a pair of third levers, and a rubber blade supported by said pair of third levers so that said rubber blade can move in a bending direction vertical to said windshield, wherein said first lever has a holder member disposed above a central portion of said rubber blade in said bending direction, and a first spoiler extending in longitudinally opposite directions from said holder member along a side of said rubber blade, said first spoiler has a pair of first connection portions disposed at opposite outer ends thereof, each of said second levers has a longitudinal lever member disposed above said rubber blade in said bending direction and a bridge member, and a second spoiler extending in longitudinal direction from a portion adjacent to said outer end of said first spoiler along the same side of said rubber blade as said first spoiler, said longitudinal lever member has a second connection portion disposed side by side with one of said pair of first connection portions connected to move in said bending direction and in parallel to said first spoiler, said first connection portions connected to said second connection portions only on one side of said rubber blade, each of said second spoiler has a third connecting portion, each of said third lever is disposed above said wiper blade in said bending direction and has a fourth connection portion disposed side by side with said third connection portion and rotatably connected to the same to move in said bending direction and in parallel to said second spoiler, and said bridge member crosses said side of said rubber blade for supporting said second spoiler to extend along said same side of said rubber blade as said first spoiler.

2. The wiper blade as claimed in claim 1, wherein
each of said second levers has a grip for supporting said rubber blade at the inner end thereof.

3. The wiper blade as claimed in claim 1, wherein
said first, second and third levers are made of resinous material.

4. The wiper blade as claimed in claim 1, wherein said first and second connection portions comprise sealed connection portions, and said third and fourth connection portions comprise sealed connecting portions.

5. The wiper blade as claimed in claim 4, wherein each of said sealed connecting portions comprises:
a pin held in holes disposed in said two of first spoiler, second lever, second spoiler and third lever to be connected.

6. The wiper blade as claimed in claim 5, wherein each of said connecting portions further comprises an elastic sealing member for sealing said connecting portion from outside.

7. A wiper blade connectable with a wiper arm of a wiper device for wiping a windshield of a vehicle, said wiper blade including a first lever connectable with said wiper arm, a pair of second levers connected to said first lever, a pair of third levers connected to said pair of second lever, a rubber blade supported by said pair of third levers and a plurality of sealed connecting portions disposed between said first lever and each of said pair of second levers and between each of said pair of second levers and one of said third levers so that said rubber blade can move in a bending direction vertical to said windshield, wherein
said first lever has a first air dam extending in longitudinally opposite directions along a side of said rubber blade, said first air dam having a pair of first connection portions disposed at opposite outer ends thereof;
each of said second lever has a longitudinal lever member disposed above said rubber blade in said bending direction that is rotatably connected to said first air dam to move in said bending direction and in parallel to said first air dam and has a pair of second air dams extending in longitudinally opposite directions along the same side of said rubber blade as said first air dam;
said longitudinal lever member has a second connection portion disposed side by side with one of said pair of first connection portions connected to move in said bending direction and in parallel to said first air dam, said first connection portions connected to said second connection portions only on one side of said rubber blade; and
each of said third lever is disposed above said rubber blade in said bending direction and rotatably connected to an outer end of said second air dams to move in said bending direction and in parallel to said second air dam.

8. The wiper blade as claimed in claim 7, wherein each of said sealed connecting portions comprises:
a pin inserted in holes disposed in two of said first air dam, second lever, second air dam and third lever to be connected.

9. The wiper blade as claimed in claim 8, wherein each of said connecting portions further comprises a elastic sealing member for sealing said connecting portion from outside.

10. The wiper blade as claimed in claim 9, wherein said elastic sealing member is an O-ring.

11. The wiper blade as claimed in claim 7, wherein each of said second levers has a grip for supporting said rubber blade at the inner end thereof.

12. The wiper blade as claimed in claim 7, wherein said first and second air dams form a unitary spoiler.

13. The wiper blade as claimed in claim 7, wherein each of said second lever has a bridge member extending across said rubber blade for supporting said second side member.

14. The wiper blade as claimed in claim 7, wherein each of said second lever has a bridge member for supporting said second air dam to extend along the same side of said rubber blade as said first air dam, so that said first and second air dam form a unitary air dam.

15. A wiper blade connectable with a wiper arm of a wiper device for wiping a windshield of a vehicle, said wiper blade comprising:
a rubber blade;
a first lever connectable with said wiper arm, said first lever having a holder member disposed above a central axis of said rubber blade to support the same in a bending direction vertical to said windshield and a first spoiler extending in a longitudinal direction from said holder member along a side of said rubber blade;
said first spoiler has a pair of first connection portions disposed at opposite outer ends thereof;
a second lever disposed above said rubber blade and rotatably connected to an end of said first spoiler so as to move in said bending direction and in parallel to said first spoiler, said second lever having a grip portion and a second spoiler extending in a longitudinal direction from said outer end of said first spoiler on the same side of said rubber blade as said first spoiler, said second lever having a longitudinal lever member disposed above said rubber blade in said bending direction;
said longitudinal lever member has a second connection portion disposed side by side with one of said pair of first connection portions connected to move in said bending direction and in parallel to said first spoiler, said first connection portions connected to said second connection portions only on one side of said rubber blade; and
a third lever disposed above said rubber blade and rotatably supported by said second spoiler so as to move in said bending direction and in parallel to said second spoiler and having a grip portion, wherein
said rubber blade is supported by said grip portions of said second and third levers.

16. The wiper blade as claimed in claim 15, further comprising pin-and-hole connections disposed between said second lever and said first spoiler and between said third lever and second spoiler.

17. The wiper blade as claimed in claim 15, wherein each of said second lever has a bridge member for support said second spoiler to extend along the said same side of said rubber blade as said first spoiler, so that said first and second air spoilers form a unitary spoiler.

18. A wiper blade connectable with a wiper arm of a wiper device for wiping a windshield of a vehicle, said wiper blade comprising:
a rubber blade having a longitudinal side surface;
a first lever connectable with said wiper arm, said first lever having a holder member disposed above a central axis of said rubber blade to support the same in a bending direction vertical to said windshield and a first spoiler extending in a longitudinal direction from said holder member along said side surface of said rubber blade;
said first spoiler has a pair of first connection portions disposed at opposite outer ends thereof;
a second lever disposed above said rubber blade, said second lever having a connecting portion that is rotatably connected to an end of said first spoiler so as to move in said bending direction and in parallel to said first spoiler, a bridge member and a second spoiler extending in a longitudinal direction from a portion adjacent to said outer end of said first spoiler along said side surface of said rubber blade, said second lever having a longitudinal lever member disposed above said rubber blade in said bending direction; and said longitudinal lever member has a second connection portion disposed side by side with one of said pair of first connection portions connected to move in said bending direction and in parallel to said first spoiler, said first connection portions connected to said second connection portions only on one side of said rubber blade;

a third lever disposed above said rubber blade, said third lever having a connecting portion that is rotatably supported by said second spoiler so as to move in said bending direction and in parallel to said second spoiler and having a grip portion, wherein said bridge member crosses said side surface of said rubber blade for supporting said second spoiler to extend along said side surface of said rubber blade, and said rubber blade is supported by said grip portion of said third lever.

19. The wiper blade as claimed in claim 18, wherein said second lever has a grip portion supporting said rubber blade together with said grip portion of said third lever.

20. The wiper blade as claimed in claim 18 wherein said first lever, second lever and third lever are made of resinous material.

21. The wiper blade as claimed in claim 18, wherein said connection portions of said second lever and said third lever have hermetic seal structures.

22. A wiper blade connectable with a wiper arm of a wiper device for wiping a windshield of a vehicle, said wiper blade comprising:

a rubber blade bendable in a vertical direction to said windshield;

a first lever having a holder member disposed above said rubber blade to hold the same in said vertical direction and a first side member extending from said holder member along said wiper blade;

said first side member has a pair of first connection portions disposed at opposite outer ends thereof;

a pair of second levers, each having a longitudinal member disposed above said rubber blade in said vertical direction and a second side member extending from said longitudinal member along said rubber blade to align said first side;

a pair of third levers disposed above said rubber blade in said vertical direction for supporting said rubber blade; wherein said longitudinal member has a second connection portion disposed side by side with one of said pair of first connection portions connected to move in said vertical direction in parallel to said first side member, said first connection portions connected to said second connection portions only on one side of said rubber blade;

each of said third levers and said second side member are disposed side by side to each other so that said third lever can move in said vertical direction in parallel to said second side member.

23. The wiper blade as claimed in claim 22, wherein each of said pair of second lever member has a bridge member between said longitudinal member and said second side member for supporting said second side member to extend along said rubber blade with said first side member.

24. A wiper blade connectable with a wiper arm of a wiper device for wiping a windshield of a vehicle, said wiper blade including a first lever connectable with said wiper arm, a pair of second levers connected to said first lever, a pair of third levers connected to said pair of second lever, a rubber blade supported by said pair of third levers and a plurality of sealed connecting portions disposed between said first lever and each of said pair of second levers and between each of said pair of second levers and one of said third levers so that said rubber blade can move in a bending direction vertical to said windshield, wherein said first lever has a first side member made of resinous material extending in longitudinally opposite directions along a side of said rubber blade;

said first side member has a pair of first connection portions disposed at opposite outer ends thereof;

each of said second lever has a longitudinal lever member made of resinous material disposed above said rubber blade in said bending direction that is rotatably connected to said first side member to move in said bending direction and in parallel to said first side member and has a pair of second side member made of resinous material extending in longitudinally opposite directions along the same side of said rubber blade as said first side member;

said longitudinal lever member has a second connection portion disposed side by side with one of said pair of first connection portions connected to move in said bending direction and in parallel to said first side member, said first connection portions connected to said second connection portions only on one side of said rubber blade, and each of said third lever is disposed above said rubber blade in said bending direction and rotatably connected to an outer end of said second side member to move in said bending direction and in parallel to said second side member.

25. The wiper blade as claimed in claim 24, wherein said plurality of sealed connecting portions are respectively disposed between said first side member and said longitudinal lever members of said second lever and between said second side members and said third levers.

26. The wiper blade as claimed in claim 24, wherein said sealed connecting portions comprises a pin-and-hole connection disposed at one of portions between said first side member and said longitudinal member of said second lever, and between said second side member and third lever.

27. The wiper blade as claimed in claim 24, wherein each of said connection portions further comprises a elastic sealing member for sealing said connection portion from outside.

28. The wiper blade as claimed in claim 27, wherein said elastic sealing member is an O-ring.

* * * * *